July 8, 1941.  J. L. WOODBRIDGE  2,248,264
FILLING AND VENTING STRUCTURE
Filed July 16, 1938

WITNESS:
R. H. Mitchell

INVENTOR
Joseph Lester Woodbridge
BY
Augustus B. Stoughton.
ATTORNEY.

Patented July 8, 1941

2,248,264

UNITED STATES PATENT OFFICE 2,248,264

FILLING AND VENTING STRUCTURE

Joseph Lester Woodbridge, Philadelphia, Pa., assignor to The Electric Storage Battery Company, Philadelphia, Pa., a corporation of New Jersey Application July 16, 1938, Serial No. 219,606

2 Claims. (Cl. 136—178)

In certain classes of service, especially for automobile starting and lighting, the storage battery is so designed and located that it is very difficult to fill it to the proper level on account of the fact that the level of the electrolyte cannot be seen during the filling operation until the cell has been over-filled. Therefore, the principal object of this invention is to prevent such overfilling under these conditions.

In general, the invention may be described broadly as consisting of a filling opening through the cover of the cell, provided with a depending tubular structure extending down to the maximum desired level of the electrolyte, outside of which tube, between the surface of the electrolyte and the under surface of the cover, there is provided a space for trapped gas which, in the absence of any vent, will prevent the electrolyte from rising into this space above the lower end of the said tube. If under these conditions the tube is filled with electrolyte up to a point where its upper surface can be observed, it will contain only a comparatively insignificant amount of electrolyte. If thereafter the space containing the trapped gas is vented into the atmosphere, the level of the excess electrolyte in the filling tube will fall to that in the cell outside of the filling tube without causing the latter to rise appreciably, and the cell will then have been filled to the desired level without any danger of overfilling.

In accordance with the present invention, the venting of the space under the cover and surrounding the filling tube is provided by openings through the wall of the filling tube close to the under side of the cover. A valve member is provided within the filling tube and closely fitting its internal walls and is arranged for limited, axial travel within the tube whereby, in its upper position, the vent openings are uncovered, and, in its lower position, they are closed. The valve member is internally threaded to receive an externally threaded vent plug which, when screwed into place, raises the valve member into its upper position, this being the normal operating position wherein the vent openings in the filling tube are uncovered and the gases developed in the cell during operation are permitted to escape through the vent plug. When, however, the vent plug is unscrewed and removed, the valve member falls by its own weight to its lower position, closing the vent openings in the filling tube. The valve member is prevented from rotating horizontally in the filling tube and its vertical travel is limited by interengaging configurations of the wall of the filling tube and the external surface of the valve member.

The object of my design is to provide a minimum number of molded parts which can be produced at minimum cost and with the simplest type of molds. In prior devices, it is necessary to provide a separate collar which is screwed onto the lower end of the filling tube. This involves molding screw-threads on the external wall at the bottom of the filling tube and molding internal screw-threads on the internal wall of the upturned flange of the collar. The collar itself is a separate molded part, adding considerably to the cost of the completed structure. Furthermore, it would be impossible to mold the sliding sleeve since the core of the mold which provides the cavity could not be removed from the finished article. In my design, the filling opening in the cover can be molded with minimum expense because there are no screw-threads involved. The internal projections can be readily formed by providing two plungers as integral parts of the top and bottom portion of the mold, meeting at the middle of the filling opening when the mold is closed, one of these plungers having cavities to provide for the projections. The plungers are therefore withdrawn when the two parts of the mold are separated and the finished article removed without further manipulation. Where screw-threads are to be provided either on the internal or the external wall of the filling tube, a much more complicated mold must be made and added labor is involved for unscrewing the finished article from the mold.

In addition, there is the advantage of making the valve member in my device of heavy metal so that, when the vent cap is removed, it will fall by its own weight with certainty. If this member were made of light material such as hard rubber, it might easily be prevented from dropping by any light friction.

The invention will be more clearly understood by reference to the accompanying drawing in which.

Figure 1:
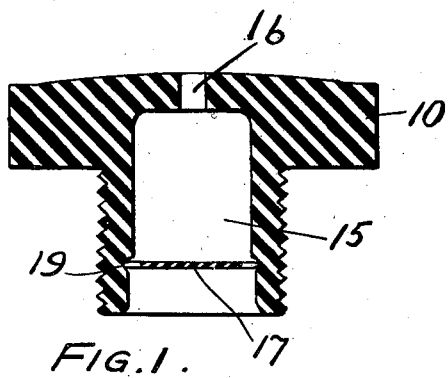
Fig. 1 is an elevation in section of the vent plug.
Figure 2:
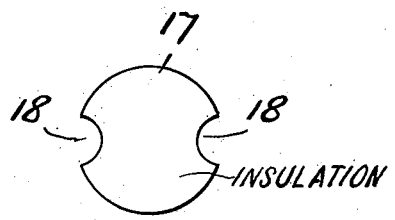
Fig. 2 is a plan view of the baffle disk of Fig. 3.
Figure 3:
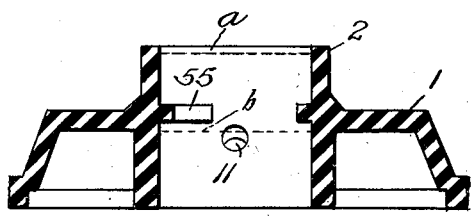
Fig. 3 is a view shown in transverse, vertical cross-section.
Figure 4:
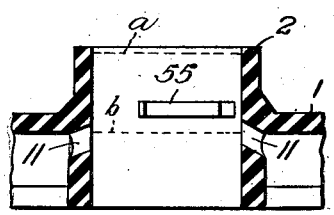
Fig. 4 is a fragmentary, vertical cross-section at right angles to Fig. 3.
Figure 5:
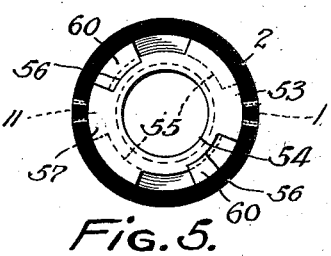
Fig. 5 is a fragmentary plan.
Figure 6:
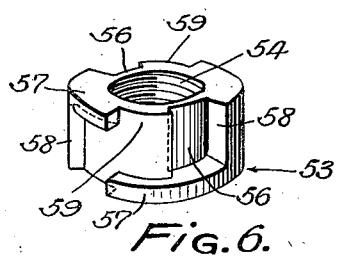
Fig. 6 is a perspective view of the valve member.
Figure 7:
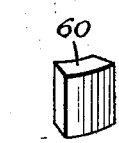
Fig. 7 is a perspective view of a locking pin.

By referring to Figs. 1 and 2, it will be seen that the vent plug has a passage 15 terminating above in a small vent opening 16 and partially closed below by the spray baffle 17. The latter is provided with openings 18 in its periphery to permit the escape of gases in the cell. It is made of resilient material such as hard rubber, permitting it to be sprung into place and held in the groove 19 in the inner wall of the passage 15 of the vent plug (Fig. 1).

In Figs. 3–7, there is shown my device which consists of a cell cover 1 having a filling and venting tube 2 extending therethrough, into which tube 2 extend projections 55 in the shape in plan of segments of a circle. Valve 53 has an opening 54 extending therethrough which is screw-threaded to receive the screw-threads on the vent plug 10 (Figure 1). Valve 53 is generally tubular in shape and has recesses 56 therein extending inwardly from its intermediate diameter. The largest diameter of valve 53 is formed by flanges 57 having portions 58 extending the full height of the valve so that the overlying and underlying flanges 57 co-operate with flanges 55 to form a bayonet locking device. In other words, valve 53 is assembled in the cell cover 1 by sliding it up into tube 2 so that the projections 55 enter the openings 59 between the ends of the overlying flanges 57 and the vertical portions 58. The valve 53 is then turned in a horizontal plane so that the flanges 55 lie between portions of the overlying and underlying flanges 57, and pins 60 are then dropped into recesses 56 so as to retain valve 53 in this position. When the valve 53 is in upper or vent-opening position, the vertical height of the valve is indicated by the lines $a$ and $b$ and hence the bottom of the valve clears the vents 11.

I do not intend to be limited save as the scope of the prior art and of the attached claims may require.

I claim:

1. In a filling and venting structure for the cover of a battery cell containing electrolyte, tubular walls defining a filling and venting passage through the cover and extending below the under surface of the cover to the desired electrolyte level, a vent opening through said tubular wall below said under surface, circumferentially interrupted projections from the internal wall of the passage located between the upper and lower ends of said passage, a perforated valve member arranged for axial travel within said passage and adapted to cover nd uncover the vent opening, said valve member having a perforation therethrough communicating with the top and bottom of said filling and venting passage, said valve member also having pockets in its external vertical walls adapted to receive said projections and of dimensions to permit both rotation and axial travel of the valve member, openings from the pockets through the horizontal surface of the valve member to permit bayonet lock engagement between the valve member and the projections, pins adapted for insertion in the openings and pockets to limit rotation of the valve member after assembly, and a vent plug adapted to engage the valve member to uncover the vent opening and to release the valve member to drop by gravity to the vent-covering position and having vents therethrough communicating with the perforation in said valve member to receive gases from the cell through the valve member.

2. A filling and venting structure for a storage battery cell comprising a cell cover having vertically extending cylindrical walls, said cell cover also having two openings at different levels therethrough, the upper of said openings being through said walls beneath the lower surface of the cell cover and communicating with the interior of the cell, the lower of said openings being at the desired liquid level and entirely surrounded by said walls, inwardly extending spaced projections on said walls and having a vertical end wall, a ring-shaped valve member having circumferentially interrupted overlying and underlying flanges co-operating with said projections to form a bayonet-type connection, said flanges spaced vertically from said projections to permit the valve member to travel vertically to cover and uncover the uppermost of said openings, a separable pin carried by said valve member and located in the interruption of one of said flanges and opposite a vertical end wall of one of said projections to prevent sufficient rotation of said valve member to permit removal, and a perforated vent plug mounted in said walls and engaging said valve member to move it to open the upper of said openings, said vent plug being removable to allow said valve member to move by gravity to close the upper opening.

JOSEPH LESTER WOODBRIDGE.